US009573575B2

(12) United States Patent
Gerdes et al.

(10) Patent No.: US 9,573,575 B2
(45) Date of Patent: Feb. 21, 2017

(54) METHOD FOR OPERATING A BRAKE BOOSTER OF A VEHICLE AND CONTROL DEVICE FOR A BREAK BOOSTER OF A VEHICLE

(71) Applicant: Robert Bosch GmbH, Stuttgart (DE)

(72) Inventors: Manfred Gerdes, Vaihingen/Enz (DE); Herbert Vollert, Vaihingen/Enz (DE)

(73) Assignee: ROBERT BOSCH GmbH, Stuttgart (DE)

( * ) Notice: Subject to any disclaimer, the term of this patent is extended or adjusted under 35 U.S.C. 154(b) by 0 days.

(21) Appl. No.: 14/383,342

(22) PCT Filed: Jan. 17, 2013

(86) PCT No.: PCT/EP2013/050771
§ 371 (c)(1),
(2) Date: Sep. 5, 2014

(87) PCT Pub. No.: WO2013/131669
PCT Pub. Date: Sep. 12, 2013

(65) Prior Publication Data
US 2015/0046053 A1 Feb. 12, 2015

(30) Foreign Application Priority Data

Mar. 8, 2012 (DE) ......................... 10 2012 203 698

(51) Int. Cl.
*G06F 7/00* (2006.01)
*G06F 19/00* (2011.01)
(Continued)

(52) U.S. Cl.
CPC .............. *B60T 13/66* (2013.01); *B60T 13/662* (2013.01); *B60T 13/74* (2013.01); *B60T 13/745* (2013.01)

(58) Field of Classification Search
CPC ........ B60T 13/66; B60T 13/662; B60T 13/74; B60T 13/745; B60T 7/042; B60T 8/3265; B60T 8/4077; B60T 17/22; B60T 8/4081
(Continued)

(56) References Cited

U.S. PATENT DOCUMENTS 3,904,251 A * 9/1975 Hikida .................. B60T 8/4241
188/181 C
4,545,198 A * 10/1985 Yoshida .................... F02C 9/28
60/39.25

(Continued)

FOREIGN PATENT DOCUMENTS

CN 101254784 A 9/2008
CN 101857017 A 10/2010
(Continued)

OTHER PUBLICATIONS

International Search Report for PCT/EP2013/050771, dated Jul. 2, 2013.

*Primary Examiner* — Khoi Tran
*Assistant Examiner* — Jorge Peche
(74) *Attorney, Agent, or Firm* — Gerard Messina

(57) ABSTRACT

A method for operating a brake booster of a vehicle includes: establishing an actual displacement speed signal of an input rod, to which a driver brake force is at least partially transmitted; filtering high-frequency and/or low-frequency signal components out of the established actual displacement speed signal; establishing a setpoint displacement speed signal of at least one booster piston, which is displaceable with the aid of the brake booster, at least in consideration of a predefined characteristic curve and the filtered actual displacement speed signal; and establishing an activation signal of the brake booster at least in consideration of the established setpoint displacement speed signal and outputting the activation signal to the brake booster to
(Continued)

displace at least the booster piston at an execution speed corresponding to the activation signal.

22 Claims, 3 Drawing Sheets

(51) Int. Cl.
*B60T 13/66* (2006.01)
*B60T 13/74* (2006.01)

(58) Field of Classification Search
USPC .............................................. 701/70, 78, 83
See application file for complete search history.

(56) References Cited

U.S. PATENT DOCUMENTS

| | | | | |
|---|---|---|---|---|
| 4,757,449 A * | 7/1988 | Kurihara | ................ | F16H 59/20 477/74 |
| 4,932,275 A * | 6/1990 | Bischoff | ............... | B60T 13/567 74/18.2 |
| 5,218,895 A * | 6/1993 | Lukich | ................ | E02F 9/2203 60/459 |
| 5,265,570 A * | 11/1993 | Schnaibel | ............ | F02D 11/105 123/339.24 |
| 5,305,681 A * | 4/1994 | Devier | ................ | F15B 21/087 60/427 |
| 5,645,326 A * | 7/1997 | Sano | ................ | B60T 8/1755 303/140 |
| 5,701,794 A * | 12/1997 | Cha | ................ | B60T 13/52 181/230 |
| 5,722,743 A * | 3/1998 | Sano | ................ | B60T 8/246 303/146 |
| 5,927,829 A * | 7/1999 | Saga | ................ | B60L 7/24 180/165 |
| 6,422,123 B1 * | 7/2002 | Linden | ................ | B60T 8/3275 91/367 |
| 6,439,067 B1 * | 8/2002 | Goldman | ................ | B62M 6/45 73/862.333 |
| 6,550,871 B1 | 4/2003 | Boehm et al. | | |
| 6,637,839 B1 * | 10/2003 | Fuchs | ................ | B60T 7/12 303/191 |
| 8,315,754 B2 * | 11/2012 | Ajiro | ................ | B60T 1/10 701/22 |
| 9,452,747 B2 * | 9/2016 | Fujiki | ................ | B60T 13/66 |
| 2003/0025035 A1 * | 2/2003 | Park | ................ | B64C 25/46 244/111 |
| 2003/0126983 A1 * | 7/2003 | Pfingst | ................ | B60T 13/52 92/86 |
| 2003/0183024 A1 * | 10/2003 | Lohberg | ................ | B60T 7/042 73/865.9 |
| 2005/0023890 A1 * | 2/2005 | Shinohara | ............... | B60T 13/57 303/113.3 |
| 2008/0106142 A1 * | 5/2008 | Nishino | ................ | B60T 8/4081 303/10 |
| 2010/0030434 A1 * | 2/2010 | Okabe | ................ | A61B 5/165 701/48 |
| 2010/0191400 A1 * | 7/2010 | Ajiro | ................ | B60T 1/10 701/22 |
| 2010/0210412 A1 * | 8/2010 | Kojima | ................ | F16H 61/143 477/38 |
| 2011/0314806 A1 * | 12/2011 | Ishizuka | ................ | B60T 7/042 60/545 |
| 2012/0193177 A1 * | 8/2012 | Goto | ................ | B60T 13/741 188/161 |
| 2012/0200147 A1 * | 8/2012 | Endo | ................ | B60T 8/38 303/3 |
| 2012/0232764 A1 * | 9/2012 | Inagawa | ................ | F02D 29/02 701/54 |
| 2013/0079994 A1 * | 3/2013 | Bunker | ................ | B60R 21/0132 701/45 |
| 2014/0350817 A1 * | 11/2014 | Stein | ................ | B60T 8/172 701/70 |
| 2015/0035352 A1 * | 2/2015 | Fujiki | ................ | B60T 7/042 303/15 |

FOREIGN PATENT DOCUMENTS

| | | | | |
|---|---|---|---|---|
| DE | 103 27 553 | 1/2005 | | |
| DE | 10 2009 045415 | 4/2011 | | |
| DE | 102009045415 A1 * | 4/2011 | ........... | B60T 13/745 |
| JP | 2002537170 A | 11/2002 | | |
| JP | 2008239142 A | 10/2008 | | |
| JP | 2010173450 A | 8/2010 | | |
| JP | 2010241171 A | 10/2010 | | |
| JP | WO 2011016095 A1 * | 2/2011 | ................ | B60T 1/10 |
| WO | 2011042238 A1 | 4/2011 | | |
| WO | WO 2011/154369 | 12/2011 | | |

* cited by examiner

METHOD FOR OPERATING A BRAKE BOOSTER OF A VEHICLE AND CONTROL DEVICE FOR A BREAK BOOSTER OF A VEHICLE

BACKGROUND OF THE INVENTION

1. Field of the Invention

The present invention relates to a method for operating a brake booster of a vehicle, and to a control device for a brake booster of a vehicle.

2. Description of the Related Art

An electromechanical brake booster is described in Published German patent application document DE 103 27 553 A1. The brake booster may interact with a sensor for detecting a pedal force acting on a piston rod. In this case, the current of the electric motor may be set using a boost factor proportional to the detected pedal force. In addition, the boost factor may be variably set as a function of a travel speed of a vehicle equipped with the electromechanical brake booster.

BRIEF SUMMARY OF THE INVENTION

The present invention provides a method for operating a brake booster of a vehicle and a control device for a brake booster of a vehicle. The present invention enables an advantageous operating mode of a brake booster. By activating the brake booster with the aid of an activation signal, which is predefinable in consideration of the setpoint displacement speed signal, which is established upon observation of the displacement speed of the input rod, it is reliably ensured that in the event of a rapid brake request of the driver, a rapid reaction may be made with the aid of a significant increase of the brake pressure provided in the brake master cylinder. Therefore, in particular in the event of a sudden and rapidly executed actuation of the brake actuating element, the brake pressure in the brake master cylinder and the at least one connected brake circuit may be significantly increased. In particular in traffic situations in which the driver desires rapid deceleration of the vehicle, this is therefore executable reliably. The present invention therefore ensures advantageous braking comfort for the driver.

In addition, the present invention provides possibilities, with the aid of which the advantageous operation of the brake booster is executable using cost-effective electronic components, which require little installation space. The implementable braking comfort described in the preceding paragraph for the driver may therefore be brought about at low cost and without increasing an installation space requirement or a total vehicle weight.

It is additionally ensured by the advantageous filtering of high-frequency and/or low-frequency signal components out of the established actual displacement speed signal that briefly occurring interfering signals have no influence on the operation of the brake booster. The method according to the present invention and the corresponding control device therefore permit a sensitive operation of the brake booster (adapted to the actuation of the brake actuating element by the driver), system-dynamic problems, such as transient behavior and/or oscillations, being prevented at the same time.

In particular, it is to be noted that the present invention enables actuation of the brake actuating element by the driver, for example, a pedal operation, without negative aspects, good and rapid response of the brake booster being ensured. As described in greater detail hereafter, the present invention also enables optimum dynamic behavior of the brake booster.

In one advantageous specific embodiment, to establish the activation signal, a setpoint rotational speed signal with respect to a setpoint rotational speed of a motor of the brake booster is established at least in consideration of the established setpoint displacement speed signal and a transmission-transmission ratio characteristic curve of a transmission of the brake booster. The establishment of the setpoint displacement speed signal may therefore also be carried out without consideration of the characteristic curve of the transmission of the brake booster. The electronics for establishing the setpoint displacement speed signal may therefore be used for a plurality of brake boosters having different transmission units. Nonetheless, it is ensured by the subsequent establishment of the setpoint rotational speed in consideration of the (specific) transmission-transmission ratio characteristic curve that the activation signal output to the brake booster is optimized with respect to its transmission.

In addition, to establish the activation signal, a setpoint torque signal with respect to a setpoint torque of the motor of the brake booster may be established at least in consideration of the established setpoint rotational speed signal and a rotational speed-torque characteristic curve of the motor. Therefore, the advantage described in the preceding paragraph is also extendable to a plurality of brake boosters having different characteristics with respect to a conversion of a torque into a rotational speed of the motor of the brake booster.

Furthermore, an activation current signal of the motor of the brake booster may be established as the activation signal, at least in consideration of the established setpoint torque signal and a power supply-torque characteristic curve of the motor. The activation of the motor of the brake booster may therefore be carried out with the aid of a simple activation signal, which may be reliably established.

In one advantageous refinement, the setpoint torque signal with respect to the setpoint torque of the motor of the brake booster is established with additional consideration of an instantaneously measured actual rotational speed signal of the motor of the brake booster. The activation of the brake booster may therefore be optimized with respect to an instantaneous functionality of the motor of the brake booster.

In another advantageous specific embodiment, a displacement travel signal with respect to a displacement travel of the input rod is measured and the actual displacement speed signal is established as a chronological difference of the displacement travel signal. A plurality of cost-effective sensors, for example, a magnetic rod travel sensor, may therefore be used to establish the actual displacement speed signal.

The high-frequency and/or low-frequency signal components may be filtered out of the established actual displacement speed signal with the aid of a smoothing filter, a bandpass filter, a crossband filter, a high-pass filter, and/or a low-pass filter. Therefore, cost-effective filters may be used for filtering the established actual displacement speed signal.

The advantages described in the preceding paragraphs are also ensured in the case of a corresponding control device for a brake booster of a vehicle.

In addition, a brake booster for a braking system of a vehicle and a braking system for a vehicle which are equipped with such a control device also implement the above-mentioned advantages.

DETAILED DESCRIPTION OF THE INVENTION

Figure 1:
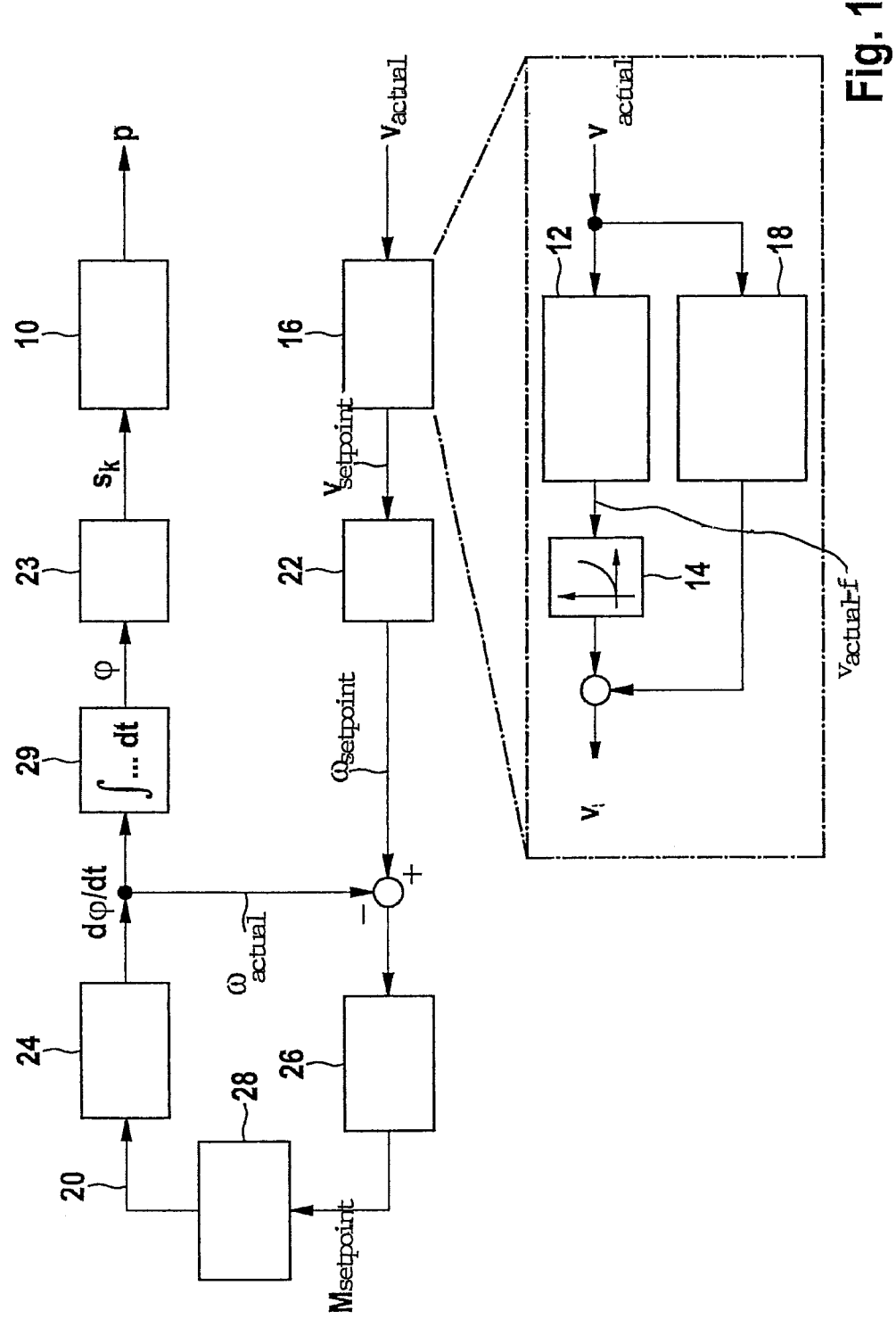
FIG. 1 shows a schematic view of a first specific embodiment of the method for operating a brake booster.

FIG. 1 shows a schematic view of a first specific embodiment of the method for operating a brake booster.

The method which is schematically shown in FIG. 1 is usable for operating a brake booster of a vehicle. Hereafter, the method is carried out in such a way that an electromechanical/electrically-operated brake booster is operated with the aid of the method. However, it is to be noted that the practicability of the method is not limited to the operation of such a brake booster. The operated brake booster may also be a pneumatic brake booster or a hydraulic brake booster, for example. Instead of an electronic boost with the aid of an electromechanical/electromotive brake booster, for example, an active brake booster may also be used, in which a boosting force of the brake booster, which is exerted on at least one displaceable piston of a brake master cylinder 10, is influenced via valves. The description of the method with respect to an electromechanical/electromotive brake booster is performed here solely because of the advantages of such a brake booster in relation to other brake booster types. An electromechanical/electromotive brake booster is dry and therefore does not require hydraulics at the driver's foot. An electromechanical/electromotive brake booster also does not require a pneumatic partial vacuum supply, is usable with a deactivated internal combustion engine, and may be adjusted and regulated largely electronically.

In one method step of the method described hereafter, an actual displacement speed signal $v_{actual}$ is established with respect to an actual displacement speed of an input rod, onto which a driver brake force exerted on a brake actuating element is at least partially transmitted. The brake actuating element may be a brake pedal, for example. It is to be noted that the practicability of the method is not limited to a specific type of a (rod-shaped) input rod. Therefore, the input rod may also be understood as a non-rod-shaped force transmission component, with the aid of which the driver braking force is transmitted directly or indirectly to the at least one displaceable piston of brake master cylinder 10.

To establish actual displacement speed signal $v_{actual}$, for example, a displacement travel signal with respect to a displacement travel of the input rod may be measured. Preferably, this takes place with the aid of a cost-effective magnetic sensor, which requires little installation space, such as a rod travel sensor in particular. Subsequently, actual displacement speed signal $v_{actual}$ may be established as the chronological difference/derivative of the displacement travel signal. The electronics usable for this purpose are cost-effective, have low weight, and require comparatively little installation space. Alternatively, actual displacement speed signal $v_{actual}$ may also be established by direct measurement with the aid of a speed sensor.

After the establishment of actual displacement speed signal $v_{actual}$, high-frequency and/or low-frequency signal components are filtered out of the established actual displacement speed signal $v_{actual}$. The high-frequency and/or low-frequency signal components may be filtered out of established actual displacement speed signal $v_{actual}$, for example, with the aid of a smoothing filter, a bandpass filter, a crossband filter, a high-pass filter, and/or a low-pass filter 12. The illustration of only low-pass filter 12 in FIG. 1, which is describable with the aid of filter characteristic curve 1: $(1+s*T_{Low})$, ($T_{Low}$ indicating the filter limit), is not to be interpreted to mean that further or multiple filters are not usable for carrying out the method step described here.

Subsequently, a setpoint displacement speed signal $v_{setpoint}$ is established with respect to a setpoint displacement speed of at least one booster piston, which is displaceable with the aid of the brake booster, at least in consideration of a predefined characteristic curve 14 and filtered actual displacement speed signal $v_{actual-f}$. Usable characteristic curve 14 may be, for example, an advantageous relation of the setpoint displacement speed of the displaceable booster piston to an established and filtered actual displacement speed of the input rod. It is to be noted that the practicability of the method is not limited to a specific type of a characteristic curve 14. The practicability of the method is also not limited to a specific type of a (rod-shaped/piston-shaped) booster piston. The booster piston may therefore also be understood as a non-piston-shaped force transmission component, with the aid of which the booster force of the brake booster is transmittable directly or indirectly to the at least one displaceable piston of brake master cylinder 10.

In the specific embodiment of FIG. 1, in a method step, which may be referred to as target definition 16, both the filtering out of high-frequency and/or low-frequency signal components and also the establishment of setpoint displacement speed signal $v_{setpoint}$ are carried out. As an advantageous refinement, target definition 16 also includes, in addition to the filtering and the conversion of actual displacement speed signal $v_{actual}$ of the input rod, the carrying out of a filtered preview control 18. However, the method described here is not limited to the carrying out of a filtered preview control 18, for example, corresponding to preview control characteristic curve $(1+x*T_{preview})/(1+S*T_{PVF})$.

The method shown here therefore allows the use of established actual displacement speed signal $v_{actual}$/the speed of the input rod of the braking system for tracking the working speed of the brake booster by establishing a corresponding setpoint displacement speed signal $v_{setpoint}$/a corresponding setpoint displacement speed. The setpoint value calculation for establishing setpoint displacement speed signal $v_{setpoint}$ of the brake booster may be easily carried out. The carried out setpoint value calculation may subsequently be used/further processed for regulating the brake boosting of the brake booster.

For this purpose, an activation signal 20 of the brake booster is established. The establishment of activation signal 20 of the brake booster is carried out at least in consideration of established setpoint displacement speed signal $v_{setpoint}$. Established activation signal 20 is then output to the brake booster, whereby the brake booster is activated in such a way that at least the booster piston is displaced at an execution speed corresponding to activation signal 20. A booster force of the brake booster is transmitted to the at least one displaceable piston of brake master cylinder 10 by the displacement of the booster piston at the execution speed. The at least one displaceable piston of brake master cylinder 10 is therefore at least displaceable using a sum of the driver brake force and the booster force of the brake booster. Carrying out the method described here therefore offers an assistance of the driver in terms of force during deceleration of his vehicle.

The speed of the input rod, which is converted to setpoint displacement speed signal $v_{setpoint}$/converted actual displacement speed signal $v_{actual}$, may be used as a setpoint value for adjusting the brake booster. This is preferably performed in that to establish activation signal 20, a setpoint rotational speed signal $\omega_{setpoint}$ with respect to a setpoint rotational speed of a motor 24 of the brake booster, which is designed as an electromechanical brake booster, is established at least in consideration of established setpoint displacement speed signal $v_{setpoint}$ and a transmission-transmission ratio characteristic curve 22 of a transmission 23 of the brake booster. Above-described target definition 16 may therefore be used for a plurality of brake boosters having differently designed transmission characteristics. At the same time, with the aid of the method step described here, activation signal 20 may be optimized with respect to transmission 23 of the activated brake booster.

To establish activation signal 20, setpoint torque signal $M_{setpoint}$ with respect to a setpoint torque of motor 24 of the brake booster is preferably also established at least in consideration of established setpoint rotational speed $\omega_{setpoint}$ and a rotational speed-torque characteristic curve 26 of the motor. The method described here may also be carried out with the aid of a PI controller. Setpoint torque signal $M_{setpoint}$ is preferably established with respect to the setpoint torque of motor 24 of the brake booster in additional consideration of an instantaneously measured/established actual rotational speed signal $\omega_{actual}$ (with respect to an actual rotational speed) of motor 24 of the brake booster. In particular, setpoint torque signal $M_{setpoint}$ may be established in consideration of a difference between setpoint torque signal $\omega_{setpoint}$ and actual rotational speed signal $\omega_{actual}$. A brake booster generally has a sensor system for ascertaining its instantaneous rotational speed, or a corresponding actual rotational speed signal $\omega_{actual}$. Therefore, electronics which are generally already provided on the brake booster may be used to carry out the method described here.

In a preferred specific embodiment, an activation current signal of motor 24 of the brake booster is established as activation signal 20 in consideration of established setpoint torque signal $M_{setpoint}$ and a power supply-torque characteristic curve 28 of motor 24. A motor controller may also be used to establish the activation current signal.

The energizing of motor 24 using activation current signal/activation signal 20 causes an actual rotational speed $\omega_{actual}$ of the motor which is not equal to zero. (The actual rotational speed of motor 24 may also be described using equation $d\phi/dt$, $\phi$ being a displacement angle of the motor). The progressive rotation of motor 24 causes a rotational angle $\phi$ which is not equal to zero, as shown in FIG. 1 with the aid of integral 29. The rotation of motor 24 also causes, via transmission 23, a piston travel $s_k$, which is not equal to zero, by which the at least one displaceable piston of brake master cylinder 10, for example, a rod piston and/or a floating piston, is displaced from its particular starting position (at a brake pressure of approximately zero). By way of the displacement of the at least one piston by piston travel $s_k$, brake pressure p, which is present in brake master cylinder 10 and at least one connected brake circuit having at least one wheel brake cylinder, may be increased.

Figure 2:
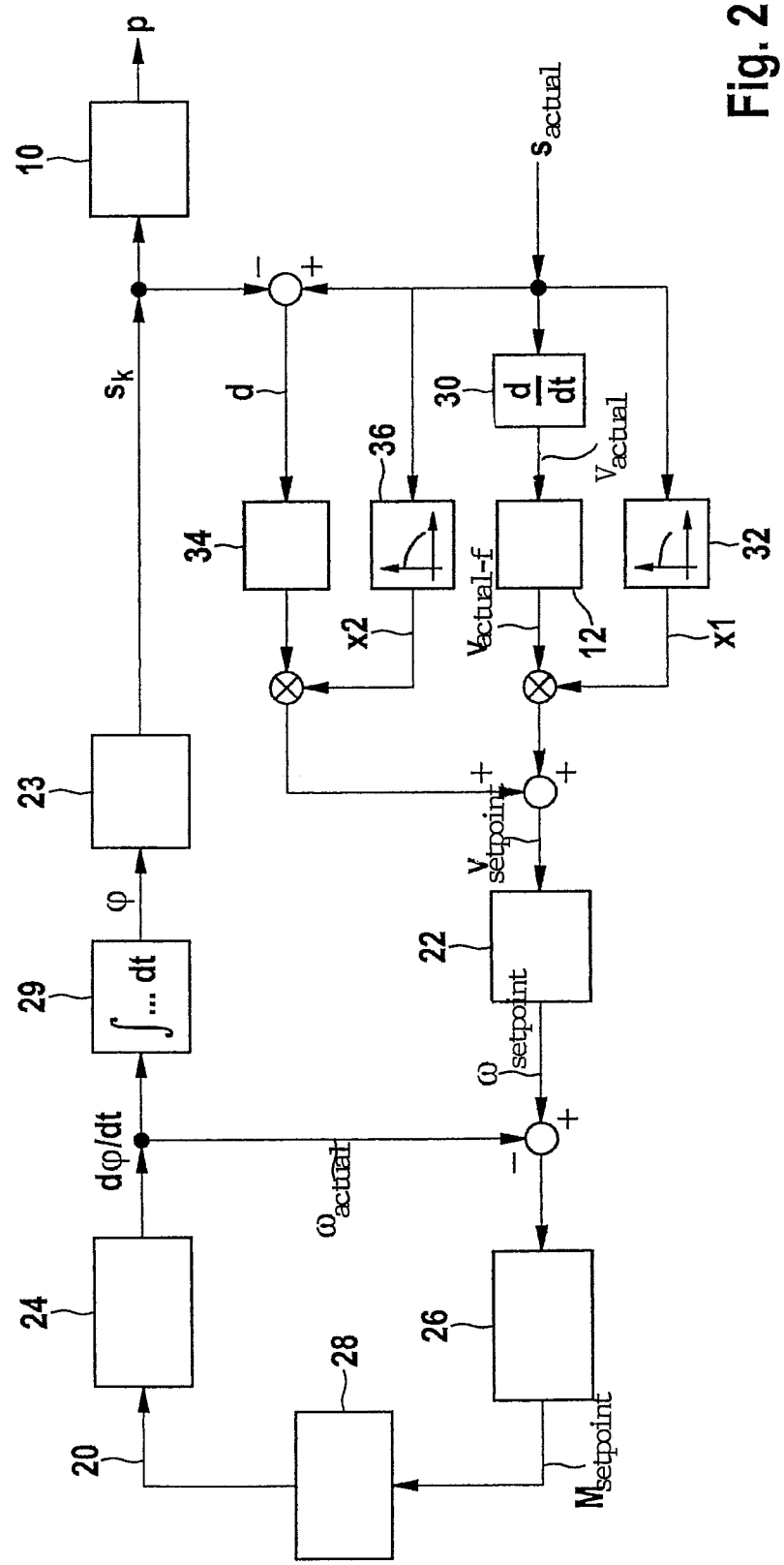
FIG. 2 shows a schematic view of a second specific embodiment of the method for operating a brake booster.

FIG. 2 shows a schematic view of a second specific embodiment of the method for operating a brake booster.

In the method of FIG. 2, actual displacement speed signal $v_{actual}$ is also established on the basis of a measured displacement travel of the input rod/a corresponding displacement travel signal $s_{actual}$. Actual displacement speed signal $v_{actual}$ is preferably a chronological difference/derivative of displacement travel signal $s_{actual}$ of the displacement travel of the input rod. A differentiation unit 30 may be used for this purpose, for example. A filtered actual displacement speed signal $v_{actual-f}$ is provided with the aid of the at least one filter 12.

In addition, in consideration of displacement travel signal $S_{actual}$ and a first weighting line 32, a first weighting factor x1 may be established, which is also considered in the establishment of setpoint displacement speed signal $v_{setpoint}$. In particular at extreme values of displacement travel signal $s_{actual}$, regulating the brake booster in consideration of the displacement speed of the input rod/actual displacement speed signal $v_{actual}$ may therefore also be omitted.

For example, the brake booster in the specific embodiment of FIG. 2 may also be regulated in consideration of a differential travel between a piston travel of the at least one displaceable piston of brake master cylinder 10 and the displacement travel of the input rod/a corresponding differential travel signal d. Differential travel signal d is established, for example, as the difference of displacement travel signal $s_{actual}$ from piston travel signal $s_k$. Subsequently, differential travel signal d may be filtered with the aid of a filter 34. In consideration of displacement travel signal $s_{actual}$ and a second weighting line 36, a second weighting factor x2 is established, by which (filtered) differential travel signal d is multiplied.

The product of (filtered) differential travel signal d and second weighting factor x2 is then added to a product of actual displacement speed signal $v_{actual}$ and first weighting factor x1. The sum obtained in this way may subsequently be analyzed to establish setpoint displacement speed signal $v_{setpoint}$ according to the above-described procedure. The further above-described method steps for activating the motor of the brake booster may also be carried out with the aid of the specific embodiment of FIG. 2. The repeated description thereof will be omitted here.

The specific embodiment of FIG. 2 additionally allows as a refinement a compensation of an offset of the piston travel by establishing the speed of the brake booster. In addition, the specific embodiment of FIG. 2 may also advantageously react to extreme/improbable values of ascertained displacement travel signal $s_{actual}$. In this way, a good/standard brake actuation feeling/pedal feeling is implementable for the driver.

Figure 3:
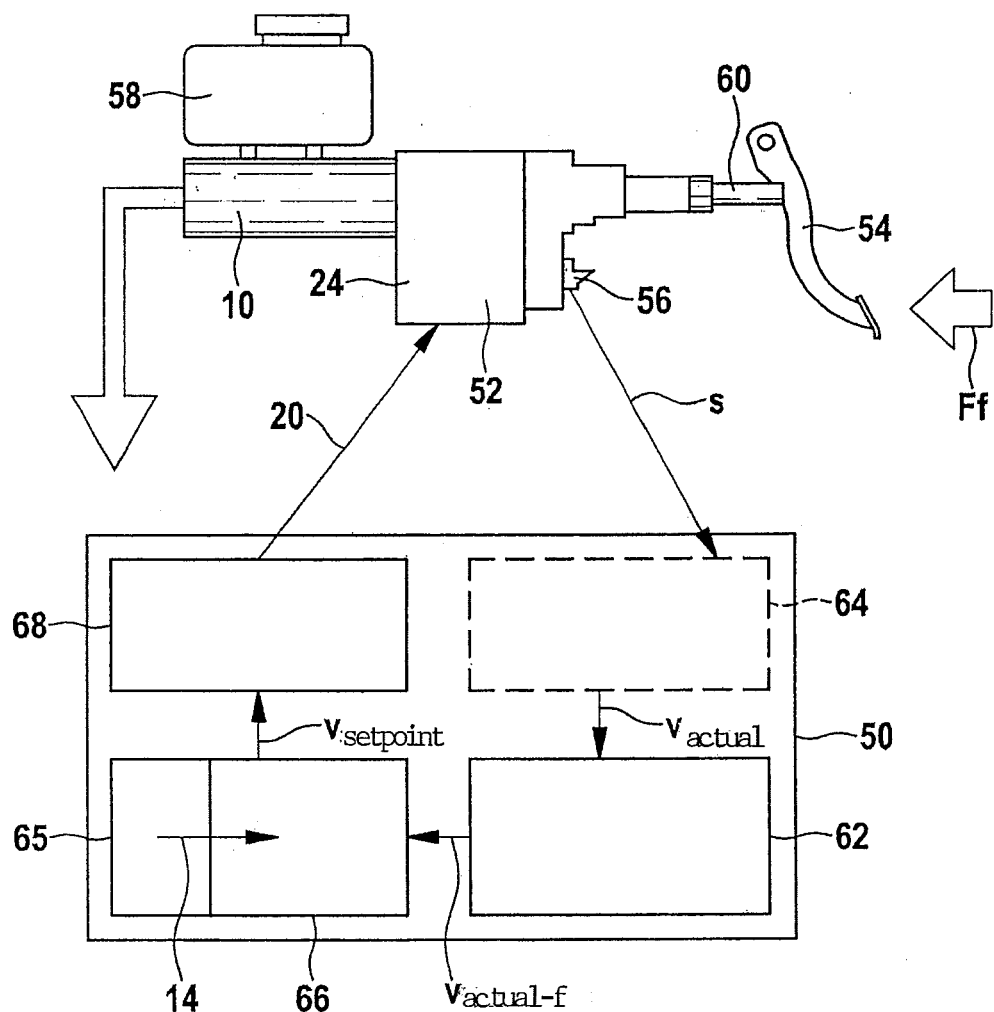
FIG. 3 shows a schematic view of a specific embodiment of the control device.

FIG. 3 shows a schematic view of a specific embodiment of the control device.

Control device 50 shown in FIG. 3 is designed to control a brake booster 52 of a vehicle. Control device 50 may be designed in particular for the purpose of carrying out the method steps of the above-described method. However, it is to be noted that the practicability of the above-described method is not limited to the use of control device 50 described hereafter. In addition, control device 50 may also be designed for the purpose of carrying out method steps other than those described above.

Brake booster 52 shown in FIG. 3 is connected via a mechanical connection to a brake actuating element 54, for example, a brake pedal. Brake booster 52 includes an (electric) motor 24 having a transmission (not shown in greater detail), via which the at least one displaceable piston, which is also mechanically coupled via a transmission (not shown) of brake master cylinder 10, may be displaced. With the aid of a schematically shown sensor 56, a displacement travel of an input rod 60 may be measured, with the aid of which a driver brake force Ff exerted on brake actuating element 54 is also transmittable to the at least one displaceable piston of brake master cylinder 10. With the aid of control device 50 described hereafter, brake booster 52 may be activated in such a way that brake master cylinder 10, which is connected to a brake fluid reservoir 58, is tracked rapidly, precisely, and intentionally adapted in accordance with a brake actuation/driver foot movement.

Control device 50 includes a filter unit 62, at which an actual displacement speed signal $v_{actual}$ with respect to an actual displacement speed of input rod 60 may be provided, and with the aid of which high-frequency and/or low-frequency signal components may be filtered out of provided actual displacement speed signal $v_{actual}$. Filter unit 62 may include, for example, a smoothing filter, a bandpass filter, a crossband filter, a high-pass filter, and/or a low-pass filter. Actual displacement speed signal $v_{actual}$ may be produced in particular with the aid of a differentiating unit 64 of control device 50, which is designed for the purpose of establishing actual displacement speed signal $v_{actual}$ on the basis of a displacement travel signal $s_{actual}$ output by sensor 56. A computer unit situated externally from control device 50 may also be used to provide actual displacement speed signal $v_{actual}$, however. (Measured displacement travel signal $s_{actual}$ may be numerically converted into actual displacement speed signal $v_{actual}$, for example).

Control device 50 also has an analysis unit 66, with the aid of which a setpoint displacement speed signal $v_{setpoint}$ with respect to a setpoint displacement speed of at least one booster piston, which is displaceable with the aid of the brake booster, may be established at least in consideration of a predefined characteristic curve 14 (for example, with the aid of a memory unit 65) and filtered actual displacement speed signal $v_{actual\text{-}f}$. In addition, control device 50 has an activation unit 68, with the aid of which a control signal 20 may be output to brake booster 52 in consideration of established setpoint displacement speed signal $v_{setpoint}$.

Activation unit 68 is preferably designed for the purpose of establishing a setpoint rotational speed signal with respect to a setpoint rotational speed of motor 24 of brake booster 52, at least in consideration of established setpoint displacement speed signal $v_{setpoint}$ and a transmission-transmission ratio characteristic curve of a transmission of brake booster 52. In addition, activation unit 68 may additionally be designed for the purpose of establishing a setpoint torque signal with respect to a setpoint torque of motor 24 of brake booster 52 at least in consideration of the established rotational speed signal and a rotational speed-torque characteristic curve of motor 24. The setpoint torque signal with respect to the setpoint torque of motor 24 of the brake booster may additionally be established in consideration of an instantaneously measured actual rotational speed signal of motor 24 of brake booster 52. Activation unit 68 is preferably additionally designed for the purpose of establishing, as activation signal 20, an activation current signal at least in consideration of the established setpoint torque signal and a power supply-torque characteristic curve of motor 24. Control device 50 therefore ensures all the above-described advantages.

Control device 50 shown in FIG. 3 is well adaptable to different vehicles. It has a simple system structure. In addition, control device 50 has a simple and transparent application.

What is claimed is:

1. A method for operating a brake booster of a vehicle, the method comprising:
    determining an actual displacement speed signal representing a measured actual displacement speed of an input rod, to which a driver brake force exerted on a brake actuating element is at least partially transmitted;
    filtering out from the actual displacement speed signal at least one of: high-frequency signal components, or low-frequency signal components;
    determining a setpoint displacement speed signal representing a setpoint displacement speed of at least one booster piston, which is displaceable with the aid of the brake booster, as a function of a predefined characteristic curve and the filtered actual displacement speed signal;
    determining an activation signal for the brake booster as a function of the setpoint displacement speed signal; and
    providing the activation signal to the brake booster to activate the brake booster to displace the at least one booster piston at an execution speed corresponding to the activation signal.

2. The method as recited in claim 1, further comprising determining a setpoint rotational speed signal representing a setpoint rotational speed of a motor of the brake booster as a function of the setpoint displacement speed signal and a transmission-transmission ratio characteristic curve of a transmission of the brake booster.

3. The method as recited in claim 2, further comprising determining a setpoint torque signal representing a setpoint torque of the motor of the brake booster as a function of the setpoint rotational speed signal and a rotational speed-torque characteristic curve of the motor.

4. The method as recited in claim 3, further comprising determining an activation current signal of the motor of the brake booster as a function of the setpoint torque signal and a power supply-torque characteristic curve of the motor.

5. The method as recited in claim 3, wherein the setpoint torque signal is further based on a measured actual rotational speed signal of the motor of the brake booster.

6. The method as recited in claim 3, further comprising determining a displacement travel signal representing a measured displacement travel of the input rod, wherein the actual displacement speed signal is determined as a chronological difference of the displacement travel signal.

7. The method as recited in claim 3, wherein the filtering of the at least one of the high-frequency signal components or the low-frequency signal components is performed using at least one of: a smoothing filter, a bandpass filter, a crossband filter, a high-pass filter, or a low-pass filter.

8. The method as recited in claim 1, wherein the predefined characteristic curve relates a characteristic setpoint displacement speed to a characteristic filtered actual displacement speed.

9. The method as recited in claim 1, further comprising measuring, using a sensor, a displacement travel of the input rod, wherein the actual displacement speed of the input rod is determined as a function of a difference in values of the displacement travel.

10. The method as recited in claim 1, further comprising directly measuring, using a sensor, the actual displacement speed of the input rod.

11. A control device for a braking system of a vehicle, the braking system including a brake actuating element and a brake booster, the control device comprising:
    a filter unit to filter out of an actual displacement speed signal representing a measured actual displacement speed of an input rod, a driver brake force exerted on the brake actuating element being at least partially transmitted to the input rod, at least one of high-frequency signal components or low-frequency signal components;

an analysis unit to determine a setpoint displacement speed signal representing a setpoint displacement speed of at least one booster piston, which is displaceable with the aid of the brake booster, as a function of a predefined characteristic curve and the filtered actual displacement speed signal; and an activation unit to provide a control signal to the brake booster, to activate the brake booster to displace the at least one booster piston, as a function of the setpoint displacement speed signal.

12. The control device as recited in claim 11, wherein the activation unit further determines a setpoint rotational speed signal representing a setpoint rotational speed of a motor of the brake booster as a function of the setpoint displacement speed signal and a transmission-transmission ratio characteristic curve of a transmission of the brake booster.

13. The control device as recited in claim 12, wherein the activation unit further determines a setpoint torque signal representing a setpoint torque of the motor of the brake booster as a function of the setpoint rotational speed signal and a rotational speed-torque characteristic curve of the motor.

14. The control device as recited in claim 13, wherein the activation unit further determines an activation current signal for the motor of the brake booster as the activation signal as a function of the setpoint torque signal and a power supply-torque characteristic curve of the motor.

15. The control device as recited in claim 13, wherein the activation unit determines the setpoint torque signal as a function of a measured actual rotational speed signal of the motor of the brake booster.

16. The control device as recited in claim 13, wherein the filter unit includes at least one of a smoothing filter, a bandpass filter, a crossband filter, a high-pass filter, or a low-pass filter.

17. The control device as recited in claim 13, wherein the control device is part of the brake booster.

18. The control device as recited in claim 17, wherein the brake booster is part of the braking system of the vehicle.

19. The control device as recited in claim 11, wherein the predefined characteristic curve relates a characteristic setpoint displacement speed to a characteristic filtered actual displacement speed.

20. The control device as recited in claim 11, wherein the actual displacement speed of the input rod is determined as a function of a difference in values of a displacement travel of the input rod measured using a sensor.

21. The control device as recited in claim 11, wherein the actual displacement speed of the input rod is directly measured using a sensor.

22. A brake booster system for a vehicle, the brake booster system comprising:

a brake booster device including at least one booster piston;

a control device configured to:
determine an actual displacement speed signal representing a measured actual displacement speed of an input rod, to which a driver brake force exerted on a brake actuating element is at least partially transmitted;

filter out from the actual displacement speed signal at least one of: high-frequency signal components, or low-frequency signal components;

determine a setpoint displacement speed signal representing a setpoint displacement speed of the at least one booster piston as a function of a predefined characteristic curve and the filtered actual displacement speed signal;

determine an activation signal for the brake booster device as a function of the setpoint displacement speed signal; and provide the activation signal to the brake booster device to displace the at least one booster piston at an execution speed corresponding to the activation signal.

* * * * *

UNITED STATES PATENT AND TRADEMARK OFFICE
CERTIFICATE OF CORRECTION

| | | |
|---|---|---|
| PATENT NO. | : 9,573,575 B2 | Page 1 of 1 |
| APPLICATION NO. | : 14/383342 | |
| DATED | : February 21, 2017 | |
| INVENTOR(S) | : Manfred Gerdes et al. | |

It is certified that error appears in the above-identified patent and that said Letters Patent is hereby corrected as shown below:

On the Title Page

In Title and in the Specification, Column 1, Lines 1-4:
Change "METHOD FOR OPERATING A BRAKE BOOSTER OF A VEHICLE AND CONTROL DEVICE FOR A BREAK BOOSTER OF A VEHICLE" to --"METHOD FOR OPERATING A BRAKE BOOSTER OF A VEHICLE AND CONTROL DEVICE FOR A BRAKE BOOSTER OF A VEHICLE"--

Signed and Sealed this
Thirtieth Day of May, 2017

Michelle K. Lee
*Director of the United States Patent and Trademark Office*